(12) United States Patent
Park et al.

(10) Patent No.: US 9,831,474 B2
(45) Date of Patent: Nov. 28, 2017

(54) BATTERY CELL OF NOVEL EMBEDDED TYPE STRUCTURE

(71) Applicant: LG CHEM, LTD., Seoul (KR)

(72) Inventors: Geon Tae Park, Busan (KR); Sooryoung Kim, Cheongwon-gun (KR); Hee Gyu Kim, Cheongwon-gun (KR); Jung Hwan Kim, Cheongju-si (KR)

(73) Assignee: LG CHEM, LTD., Seoul (KR)

( * ) Notice: Subject to any disclaimer, the term of this patent is extended or adjusted under 35 U.S.C. 154(b) by 512 days.

(21) Appl. No.: 14/301,473

(22) Filed: Jun. 11, 2014

(65) Prior Publication Data

US 2014/0295253 A1  Oct. 2, 2014

Related U.S. Application Data

(63) Continuation of application No. PCT/KR2013/000777, filed on Jan. 31, 2013.

(30) Foreign Application Priority Data

Feb. 7, 2012  (KR) ........................ 10-2012-0012098

(51) Int. Cl.
*H01M 2/02* (2006.01)
*H01M 2/10* (2006.01)
(Continued)

(52) U.S. Cl.
CPC ......... *H01M 2/0202* (2013.01); *H01M 2/022* (2013.01); *H01M 2/026* (2013.01); *H01M 2/027* (2013.01); *H01M 2/029* (2013.01); *H01M 2/0217* (2013.01); *H01M 2/0285* (2013.01); *H01M 2/0292* (2013.01); *H01M 2/1061* (2013.01); *H01M 2/30* (2013.01); *H01M 10/052* (2013.01); *H01M 2220/30* (2013.01)

(58) Field of Classification Search
CPC .................................................. H01M 2/0217
See application file for complete search history.

(56) References Cited

U.S. PATENT DOCUMENTS

2003/0129487 A1  7/2003  Inoue et al.
2003/0203279 A1  10/2003  Tsukamoto et al.
(Continued)

FOREIGN PATENT DOCUMENTS

CN       1510779 A     7/2004
CN       1512609 A     7/2004
(Continued)

OTHER PUBLICATIONS

International Search Report issued in PCT/KR2013/000777, dated May 15, 2013.

*Primary Examiner* — Stephan Essex
(74) *Attorney, Agent, or Firm* — Birch, Stewart, Kolasch & Birch, LLP

(57) ABSTRACT

Disclosed herein is a battery cell including an electrode assembly of a cathode/separator/anode structure, the electrode assembly being impregnated with an electrolyte, the electrode assembly being chargeable and dischargeable, a battery case in which the electrode assembly is mounted, the battery case being made of aluminum or an aluminum alloy, and an alumina coating layer applied to at least a portion of an outer surface of the battery case by anodizing.

14 Claims, 6 Drawing Sheets

(51) Int. Cl.
    *H01M 2/30*      (2006.01)
    *H01M 10/052*    (2010.01)

(56)            References Cited

U.S. PATENT DOCUMENTS

| | | |
|---|---|---|
| 2004/0126651 A1 | 7/2004 | Kim et al. |
| 2006/0208700 A1 | 9/2006 | Kim et al. |
| 2007/0026307 A1 | 2/2007 | Kim |
| 2007/0154790 A1 | 7/2007 | Jeung et al. |
| 2009/0269654 A1 | 10/2009 | Kairawicz et al. |
| 2011/0033734 A1* | 2/2011 | Chamberlain, II . H01M 2/0202 429/53 |
| 2011/0302761 A1* | 12/2011 | Dupuis .................. C25D 5/022 29/428 |
| 2013/0295417 A1 | 11/2013 | Koh et al. |

FOREIGN PATENT DOCUMENTS

| | | |
|---|---|---|
| JP | 2000-106152 A | 4/2000 |
| JP | 2001-291526 A | 10/2001 |
| JP | 2005-251577 A | 9/2005 |
| JP | 2006-269425 A | 10/2006 |
| JP | 2006-302662 A | 11/2006 |
| JP | 2007-287514 A | 11/2007 |
| JP | 2011-146372 A | 7/2011 |
| JP | 2011-520222 A | 7/2011 |
| KR | 10-2009-0027901 A | 3/2009 |
| KR | 10-2010-0067331 A | 6/2010 |
| TW | I336150 | 1/2011 |

* cited by examiner

[FIG. 1]
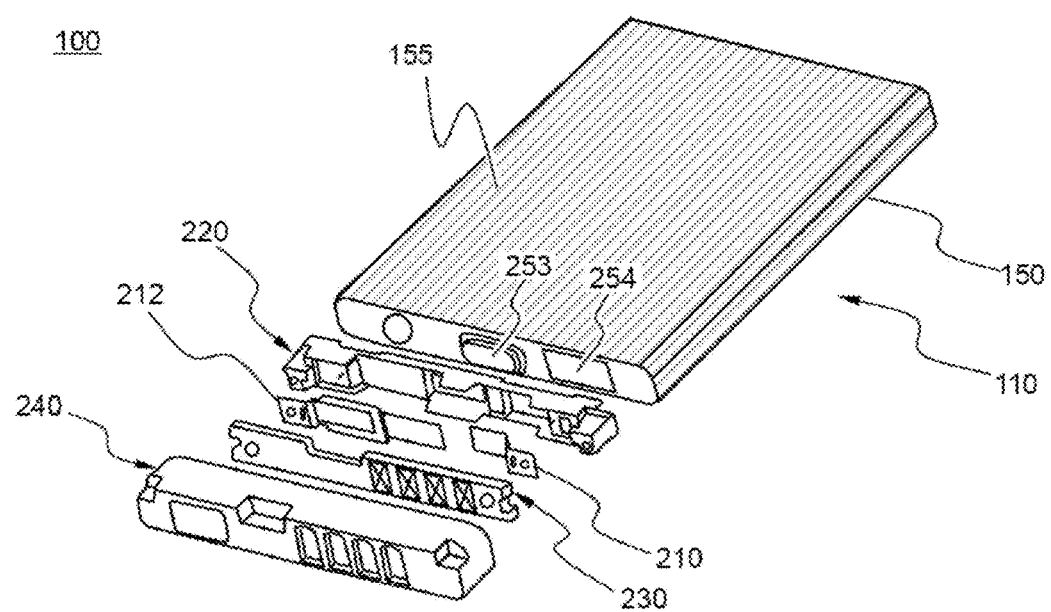

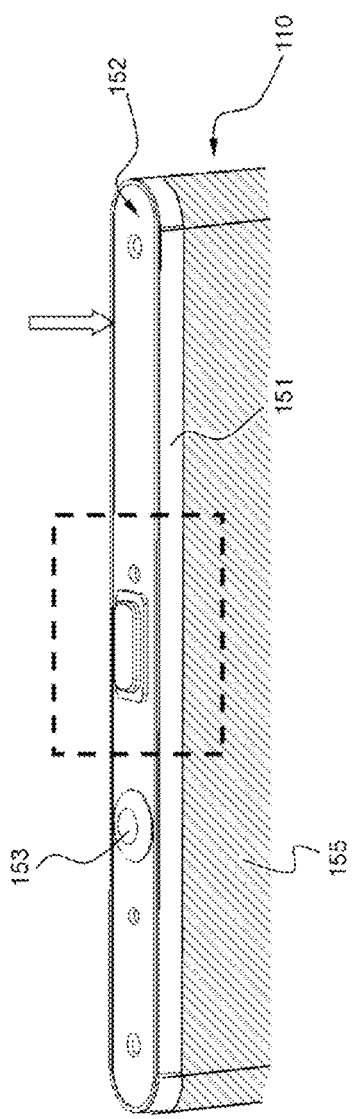
[FIG. 2]

[FIG. 3]
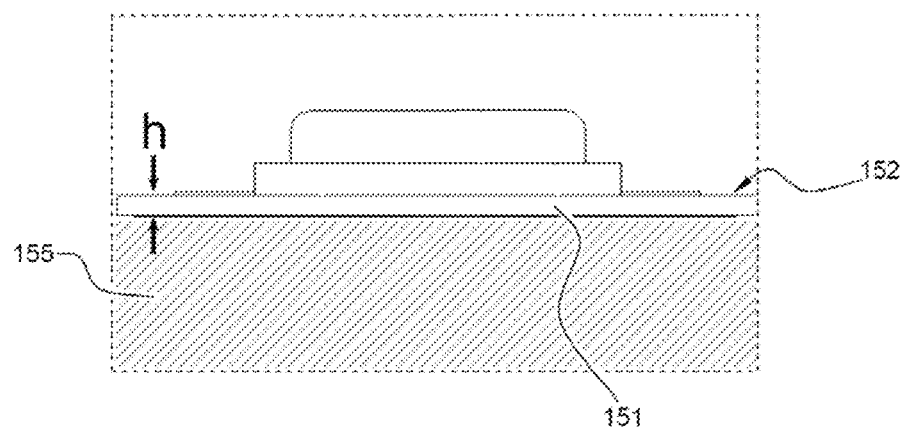

[FIG. 4]
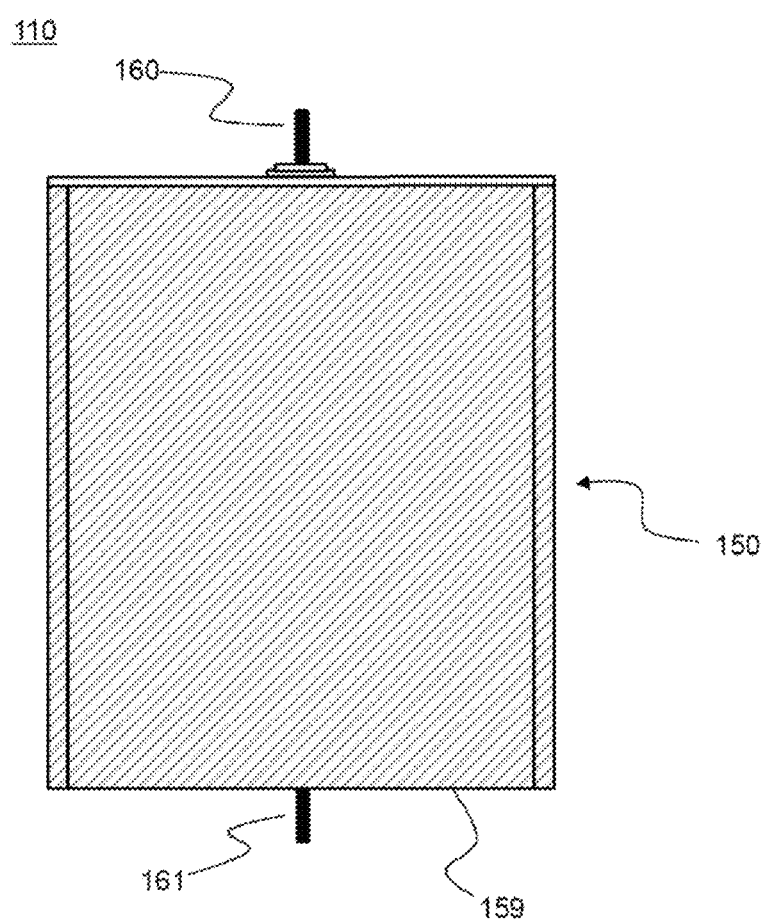

[FIG. 5]
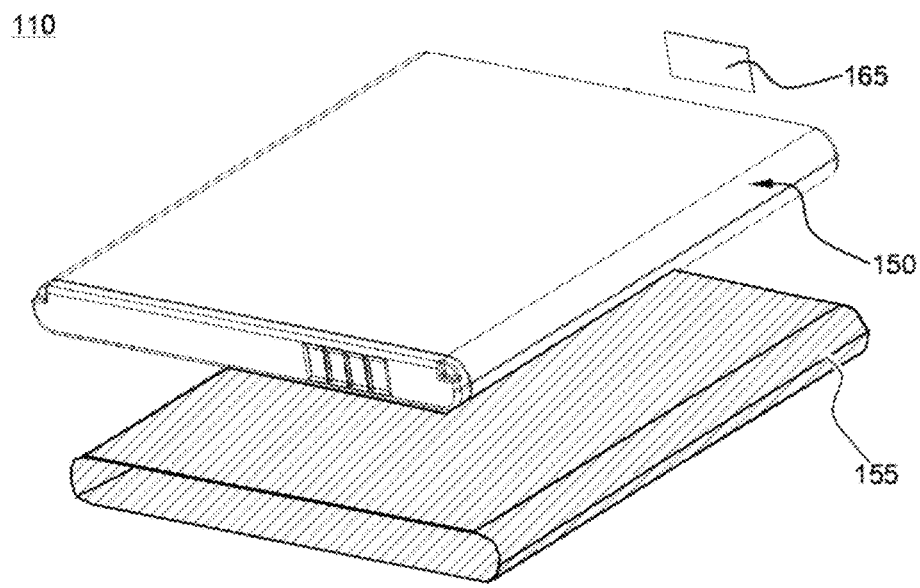
[FIG. 6]
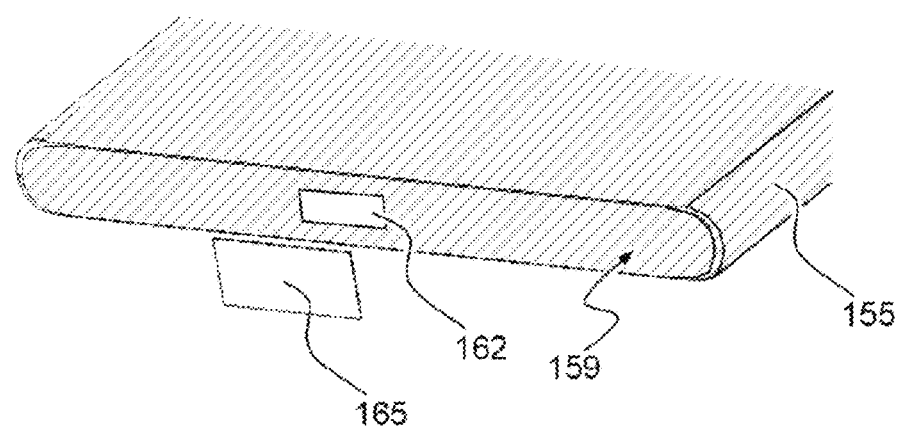

[FIG. 7]
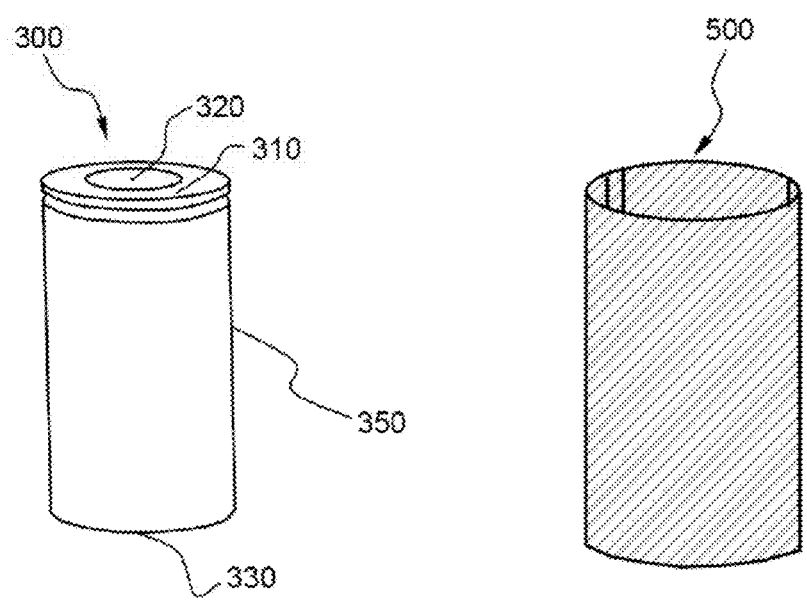
[FIG. 8]
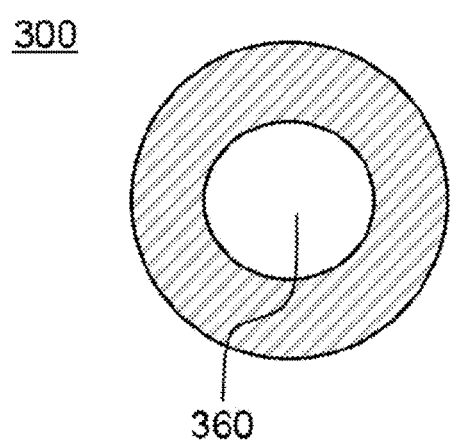

BATTERY CELL OF NOVEL EMBEDDED TYPE STRUCTURE

CROSS REFERENCE TO RELATED APPLICATIONS

This application is a continuation of PCT International Application No. PCT/KR2013/000777 filed on Jan. 31, 2013, which claims priority under 35 U.S.C 119(a) to Application No. 10-2012-0012098 filed on Feb. 7, 2012 in the Republic of Korea, all of which are hereby expressly incorporated by reference into the present application.

TECHNICAL FIELD

The present invention relates to an embedded type battery cell, and, more particularly, to a battery cell including an electrode assembly of a cathode/separator/anode structure, the electrode assembly being impregnated with an electrolyte, the electrode assembly being chargeable and dischargeable, a battery case in which the electrode assembly is mounted, the battery case being made of aluminum or an aluminum alloy, and an alumina coating layer applied to at least a portion of an outer surface of the battery case by anodizing.

BACKGROUND ART

As mobile devices have been increasingly developed, and the demand for such mobile devices has increased, the demand for secondary batteries as an energy source has also sharply increased.

Depending upon kinds of external devices in which secondary batteries are used, the secondary batteries may be used in the form of a single battery or in the form of a battery pack having a plurality of unit cells electrically connected to on another. For example, small-sized devices, such as mobile phones, can be operated for a predetermined period of time with the power and the capacity of one battery. On the other hand, a battery pack including a plurality of batteries needs to be used in middle or large-sized devices, such as laptop computers, portable digital versatile disc (DVD) players, small-sized personal computers (PCs), electric vehicles, and hybrid electric vehicles, because high power and large capacity are necessary for the middle or large-sized devices.

Among secondary batteries, a lithium secondary battery is widely used since the lithium secondary battery has high power and large capacity.

However, various kinds of combustible materials are contained in the lithium secondary battery. As a result, the lithium secondary battery may be heated or explode due to overcharge of the lithium secondary battery, overcurrent in the lithium secondary battery, or other external physical impact applied to the lithium secondary battery. That is, the safety of the lithium secondary battery is very low. Consequently, safety elements, such as a positive temperature coefficient (PTC) element and a protection circuit module (PCM), to effectively control an abnormal state of the lithium secondary battery, such as overcharge of the lithium secondary battery or overcurrent in the lithium secondary battery, are loaded on a battery cell in a state in which the safety elements are connected to the battery cell.

Generally, the PCM is electrically connected to the battery cell via conductive nickel plates by welding or soldering. That is, nickel plates are connected to electrode tabs of the PCB by welding or soldering, and the nickel plates are connected to electrode terminals of the battery cell by welding or soldering. In this way, the PCM is connected to the battery cell to manufacture a battery pack.

It is required for the safety elements, including the PCM, to be maintained in electrical connection with the electrode terminals of the battery cell and, at the same time, to be electrically isolated from other parts of the battery cell. To this end, a plurality of parts is necessary, which complicates an assembly process of the battery pack. In addition, a space necessary to receive the battery cell is reduced.

Furthermore, a battery case to receive the parts is made of conductive metal exhibiting high electric conductivity, such as metal plated with aluminum, an aluminum alloy, or nickel. As a result, a short circuit may be caused in the battery cell when the battery case contact other parts of the battery cell.

Consequently, there is a high necessity for a battery cell that is capable of securing a receiving space and insulativity of the battery cell and, at the same time, preventing the outer surface of a battery case from being corroded or worn while using a conventional battery cell and a conventional assembly method.

DISCLOSURE

Technical Problem

Therefore, the present invention has been made to solve the above problems and other technical problems that have yet to be resolved.

As a result of a variety of extensive and intensive studies and experiments to solve the problems as described above, the inventors of the present application have developed a battery cell wherein a battery case is anodized to improve insulativity and capacity of the battery cell and completed the present invention.

Therefore, it is an object of the present invention to provide a battery cell wherein the outer surface of an aluminum battery case is anodized to improve corrosion resistance, wear resistance, and insulativity of the battery case.

Technical Solution

In accordance with one aspect of the present invention, the above and other objects can be accomplished by the provision of a battery cell including an electrode assembly of a cathode/separator/anode structure, the electrode assembly being impregnated with an electrolyte, the electrode assembly being chargeable and dischargeable, a battery case in which the electrode assembly is mounted, the battery case being made of aluminum or an aluminum alloy, and an alumina coating layer applied to at least a portion of an outer surface of the battery case by anodizing.

In the battery cell according to the present invention, therefore, durability and corrosion resistance of the battery case are improved through anodizing of the battery case. Also, dyeing of the battery case is possible due to small porosity and fiber property thereof, thereby improving wear resistance and utility of the battery case.

The battery case may have various forms. For example, the battery case may be a prismatic metal container; however, the battery case is not limited thereto.

In a preferred example, the alumina coating layer may be applied to the outer surface of the battery case in a state in which an uncoated margin section having a predetermined length is provided downward from an outer circumference of an upper end of the battery case. The uncoated margin section provides easily weldability, for example, when laser welding is carried out after a cap plate is mounted to an open upper end of the battery case.

More preferably, the uncoated margin section extends downward from the outer circumference of the upper end of the battery case by a length of 0.5 to 5 mm. If the length of the uncoated margin section is too long, it may be difficult to achieve desired durability of the battery case based on surface treatment, which is not preferable. On the other hand, if the length of the uncoated margin section is too short, it may not be possible to easily carry out laser welding, which is not preferable.

The method of forming the uncoated margin section is not particularly restricted. For example, the uncoated margin section may be formed by anodizing the battery case in a state in which an insulation material is applied to the battery case or an insulator or an insulation tape is mounted or attached to the battery case and removing the insulation material, the insulator, or the insulation tape.

In a preferred example, the alumina coating layer may have a thickness of 0.01 to 0.05 mm.

The battery cell is activated during manufacturing of the battery cell. A battery cell activation process is a process of initially charging and discharging the battery cell in a state in which the electrode assembly is impregnated with an electrolyte to forming a protective film on an anode surface. Two battery cell activation processes may be performed depending upon charge pin connection methods. Correspondingly, the construction of the battery cell according to the present invention may be modified.

The first battery cell activation process may be performed in a state in which a cathode charge pin and an anode charge pin are connected to an upper end of the battery cell, and the alumina coating layer may be applied throughout a bottom of the battery case.

The second battery cell activation process may be performed in a state in which an anode (or cathode) charge pin is connected to an upper end of the battery cell and a cathode (or anode) charge pin is connected to a lower end of the battery cell, and the alumina coating layer may be applied to a bottom of the battery case excluding a connection opening section, to which the cathode (or anode) charge pin is connected.

The shape of the connection opening section is not particularly restricted so long as the connection opening section corresponds to the charge pins. For example, the connection opening section may be formed in a circular, oval, or polygonal shape in plan.

The connection opening section may be formed by anodizing the battery case in a state in which an insulation material is applied to a portion of the bottom of the battery case or an insulator or an insulation tape is mounted or attached to a portion of the bottom of the battery case and removing the insulation material, the insulator, or the insulation tape.

In another preferred example, the battery case may be a cylindrical battery case.

The alumina coating layer may applied throughout a side of the cylindrical battery case.

A battery cell activation process, which is carried out during manufacturing of the battery cell, may be performed in a state in which a cathode (or anode) charge pin is connected to an upper end of the battery cell and an anode (or cathode) charge pin is connected to a lower end of the battery cell, and the alumina coating layer may be applied to a bottom of the battery case excluding a connection opening section, to which the anode (or cathode) charge pin is connected.

Specifically, the connection opening section may be formed by anodizing the battery case in a state in which an insulation material is applied to a portion of the bottom of the battery case or an insulator or an insulation tape is mounted or attached to a portion of the bottom of the battery case and removing the insulation material, the insulator, or the insulation tape.

In the above-mentioned examples, the connection opening section may be sealed using an insulation member after the battery cell activation process.

The material for the insulation member is not particularly restricted so long as the insulation member protects the connection opening section from the outside and maintains electrical insulation of the connection opening section.

The kind of the battery cell is not particularly restricted. For example, the battery cell may be a lithium secondary battery. The secondary battery may be a single battery including one battery cell or an assembled battery including two or more battery cells. Therefore, the secondary battery is not denoted by a specific title.

The composition, structure, and manufacturing method of the secondary battery, including the lithium secondary battery, is obvious to a person having an ordinary skill in the part to which the present invention pertains, and therefore, a detailed description thereof will be omitted.

In accordance with another aspect of the present invention, there is provided a secondary battery pack including the battery cell with the above-stated construction mounted in a pack case. The secondary battery pack may be an embedded pack.

In accordance with a further aspect of the present invention, there is provided a mobile device including the secondary battery pack with the above-stated construction embedded therein as a power source. Specifically, the mobile device may be a thin laptop computer, a tablet PC, or a smart pad; however, the mobile device is not limited thereto.

Also, the secondary battery pack may be used as a power source for an electric vehicle (EV), a hybrid electric vehicle (HEV), a plug-in hybrid electric vehicle (PHEV), or a power storage device.

The above device or apparatuses are well known in the part to which the present invention pertains, and therefore, a detailed description thereof will be omitted.

Effects of the Invention

As is apparent from the above description, the entire surface of the battery case is anodized in a state in which the connection opening section is provided at the bottom of the battery case, thereby improving corrosion resistance, wear resistance, and insulativity of the battery case.

Also, an additional process of attaching a label to the outer surface of the battery case is not necessary, thereby easily manufacturing the battery cell and providing capacity greater than that of other battery cells having the same standard.

DESCRIPTION OF DRAWINGS

The above and other objects, features and other advantages of the present invention will be more clearly understood from the following detailed description taken in conjunction with the accompanying drawings, in which:

FIG. 1 is an exploded perspective view showing a battery pack according to an embodiment of the present invention;

FIG. 2 is a partial perspective view showing the upper end of a battery cell according to an embodiment of the present invention;

FIG. 3 is a partial side view of FIG. 2;

FIG. 4 is a front view showing the battery cell to which connection pins, which are used during a charging process to activate the battery cell, are coupled;

FIG. 5 is an exploded perspective view showing the battery cell, an anodized part, and an insulation tape;

FIG. 6 is a partial perspective view showing the lower end of the battery cell;

FIG. 7 is an exploded perspective view showing a cylindrical battery cell according to another embodiment of the present invention and an anodized part; and FIG. 8 is a bottom view showing the bottom of the cylindrical battery cell according to the embodiment of the present invention.

DETAILED DESCRIPTION OF THE INVENTION

Now, preferred embodiments the present invention will be described in detail with reference to the accompanying drawings. It should be noted, however, that the scope of the present invention is not limited by the illustrated embodiments.

FIG. 1 is an exploded perspective view typically showing a secondary battery pack according to an embodiment of the present invention.

Referring to FIG. 1, a secondary battery pack 100 according to the present invention includes a battery cell 110, an insulative mounting member 220, a protection circuit board 230, a pair of connection members 210 and 212, a top cap 240, and a battery case 150 having an anodized part 155. The insulative mounting member 220, the connection members 210 and 212, the protection circuit board 230, and the top cap 240 are sequentially mounted to the top of the battery cell 110.

The insulative mounting member 220 is provided with openings (not shown), through which electrode terminals 253 and 254 of the battery cell 110 are exposed. The insulative mounting member 220 is directly loaded on the top of the battery cell 110. The insulative mounting member 220 may be coupled to the top of the battery cell 110 using a bonding agent.

The insulative top cap 240 is coupled to the upper end of the battery cell 110 while surrounding the insulative mounting member 220 in a state in which the connection members 210 and 212 and the protection circuit board 230 are loaded on the insulative top cap 240. Also, the insulative top cap 240 extends downward by a predetermined length to surround the outer circumference of the upper end of the battery cell 110.

FIG. 2 is a partial perspective view showing the upper end of a battery cell according to an embodiment of the present invention, FIG. 3 is a partially enlarged side view of FIG. 2, FIG. 4 is a front view showing the battery cell to which connection pins, which are used during a charging process to activate the battery cell, are coupled, FIG. 5 is an exploded perspective view showing the battery cell, an anodized part, and an insulation tape, and FIG. 6 is a partial perspective view showing the lower end of the battery cell. For the convenience of description, the anodized part is shown in a state in which the anodized part is separated from the battery case in FIG. 5, whereas the anodized part is shown in a state in which the anodized part is not separated from the battery case in FIG. 6.

Referring to these drawings, the entire surface of the battery case 150 is anodized (155) in a state in which an uncoated margin section 151 having a length h of about 3 mm is provided downward from the outer circumference of the upper end of the battery case 150. The uncoated margin section 151 is formed by anodizing the battery case 150 in a state in which an insulation material (not shown) is temporarily applied to the battery case 150 and removing the insulation material.

Also, the battery cell 110 having an electrode assembly of a cathode/separator/anode structure disposed in the battery case 150 made of aluminum together with an electrolyte in a sealed state is manufactured as follows. First, the entire surface of the battery case 150 is anodized (155) in a state in which a connection opening section 162, to which charge pins 160 and 161 used to activate the battery cell 110 are connected, is formed at the bottom 159 of the battery case 150. Subsequently, the electrode assembly is mounted in the battery case 150, laser welding is carried out at the open upper end of the battery case 150 along the outer circumference of the battery cell 110 above a cap plate 152 (see an arrow shown in FIG. 2), an electrolyte is injected through an electrolyte injection port 153 of the cap plate 152, and the battery cell is activated. Subsequently, the electrolyte is replenished, and then the electrolyte injection port 153 is sealed.

The connection opening section 162 is formed in a quadrangular shape in plan. Alternatively, the connection opening section 162 may be formed in various shapes in plan.

Also, the connection opening section 162 is formed by anodizing (155) the battery case 150 in a state in which an insulation material (not shown) is applied to a portion of the bottom of the battery case 150 and removing the insulation material.

Finally, the connection opening section 162 is sealed using an insulation member 165, such as an insulation tape.

The battery cell activation process is performed in a state in which the first charge pin 160 is connected to an upper electrode terminal 131 of the cap plate 152 and the second charge pin 161 is connected to the connection opening section 162 of the battery case 150.

Consequently, the connection of the second charge pin 161 is easily achieved by the provision of the connection opening section 162.

FIG. 7 is an exploded perspective view showing a cylindrical battery cell according to another embodiment of the present invention and an anodized part, and FIG. 8 is a bottom view showing the bottom of the cylindrical battery cell according to the embodiment of the present invention. For the convenience of description, the anodized part is shown in a state in which the anodized part is separated from the battery case in FIG. 7.

Referring to these drawings, a cylindrical battery cell 300 has an electrode assembly disposed in a cylindrical battery case 350 together with an electrolyte in a sealed state. The entire surface of the battery case 350 excluding a connection opening section 360, to which charge pins (not shown) used to activate the battery cell 300 are connected, is anodized (500).

A cathode terminal 320 is formed at the top 310 of the cylindrical battery cell 300 such that the cathode terminal 320 protrudes upward in a state in which the cathode terminal 320 is isolated from the battery case 350. An anode terminal 330 is formed at the bottom of the battery cell 300.

Anodizing (500) the entire surface of the battery case 350 excluding the connection opening section 360 of the cylindrical battery cell 300 is identical to what has been described above with reference to FIGS. 1 to 6 except that the uncoated margin section 151 (see FIG. 3) is formed, and therefore, a description thereof will be omitted.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery, comprising:
an electrode assembly of a cathode/separator/anode structure, the electrode assembly being impregnated with an electrolyte, the electrode assembly being chargeable and dischargeable;
a sealed battery case in which the electrode assembly is mounted, the battery case being made of aluminum or an aluminum alloy; and
an alumina coating layer applied to at least a portion of an outer surface of the sealed battery case by anodizing to form a coated battery case, a top surface of the outer surface of the sealed battery case is not coated with the alumina coating layer; and
an insulative mounting member mounted to the top surface of the sealed battery case,
wherein said top surface has electrode terminals of the electrode assembly extending therethrough.

2. The battery according to claim 1, wherein the sealed battery case is a prismatic battery case.

3. The battery according to claim 1, wherein insulation material is applied to the sealed battery case prior to applying the anodized alumina coating layer and is removed after applying the anodized alumina coating layer.

4. The battery according to claim 1, wherein the anodized alumina coating layer has a thickness of 0.01 to 0.05 mm.

5. The battery according to claim 1, wherein the anodized alumina coating layer is applied by anodizing the battery case in a state in which an insulation material is applied to the top surface and removing the insulation material.

6. The battery according to claim 1, wherein the sealed battery case is a cylindrical battery case.

7. The battery according to claim 1, wherein the alumina coating layer is applied throughout a side of the sealed battery case.

8. The battery according to claim 1, wherein the battery cell is a lithium secondary battery cell.

9. A secondary battery pack comprising the battery according to claim 1 mounted in a pack case.

10. The secondary battery pack according to claim 9, wherein the secondary battery pack is an embedded pack.

11. A mobile device comprising a secondary battery pack according to claim 9 embedded therein as a power source.

12. The battery according to claim 1, further comprising a pair of connection members mounted to the insulative mounting member.

13. The battery according to claim 12, further comprising a top cap mounted to the pair of connection members.

14. The battery according to claim 1, wherein a portion of side surfaces extending downward from said top surface, towards a bottom surface, is not provided with said anodized alumina coating layer.

* * * * *